United States Patent
Oh et al.

(10) Patent No.: US 11,557,783 B2
(45) Date of Patent: Jan. 17, 2023

(54) POLYMER ELECTROLYTE MEMBRANE FOR FUEL CELLS AND METHOD FOR MANUFACTURING THE SAME

(71) Applicants: Hyundai Motor Company, Seoul (KR); Kia Motors Corporation, Seoul (KR)

(72) Inventors: Jong Kil Oh, Gyeonggi-do (KR); In Yu Park, Seoul (KR); Bo Ki Hong, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 66 days.

(21) Appl. No.: 16/983,248

(22) Filed: Aug. 3, 2020

(65) Prior Publication Data

US 2021/0075049 A1    Mar. 11, 2021

(30) Foreign Application Priority Data

Sep. 5, 2019  (KR) .................. 10-2019-0109843

(51) Int. Cl.
*H01M 8/1053* (2016.01)
*H01M 8/1069* (2016.01)
*H01M 8/10* (2016.01)

(52) U.S. Cl.
CPC ....... *H01M 8/1053* (2013.01); *H01M 8/1069* (2013.01); *H01M 2008/1095* (2013.01); *H01M 2300/0082* (2013.01)

(58) Field of Classification Search
None
See application file for complete search history.

(56) References Cited

U.S. PATENT DOCUMENTS

| 5,342,494 A | 8/1994 | Shane et al. | |
| 2007/0072036 A1* | 3/2007 | Berta | H01M 4/8807 |
| | | | 429/432 |
| 2019/0207226 A1* | 7/2019 | Yun | H01M 8/1039 |

FOREIGN PATENT DOCUMENTS

| JP | 2003059512 A | * | 2/2003 |
| JP | 2003059512 A | | 2/2003 |
| JP | 2009089573 A | * | 4/2009 |
| JP | 2009289573 A | * | 12/2009 |
| JP | 5223464 B2 | | 6/2013 |
| JP | 5919554 B2 | | 5/2016 |
| KR | 20100107012 A | | 10/2010 |
| KR | 101669236 B1 | | 10/2016 |
| KR | 20170113431 A | | 10/2017 |
| KR | 101877753 B1 | | 7/2018 |
| KR | 101877755 B1 | | 7/2018 |
| KR | 101900772 B1 | | 9/2018 |

* cited by examiner

*Primary Examiner* — Daniel S Gatewood
(74) *Attorney, Agent, or Firm* — Fox Rothschild LLP

(57) ABSTRACT

Disclosed are a polymer electrolyte membrane for fuel cells which has improved handling properties and mechanical strength by employing symmetric-type laminated composite films and a method for manufacturing the same.

14 Claims, 8 Drawing Sheets

POLYMER ELECTROLYTE MEMBRANE FOR FUEL CELLS AND METHOD FOR MANUFACTURING THE SAME

CROSS-REFERENCE TO RELATED APPLICATION

This application claims under 35 U.S.C. § 119(a) the benefit of priority to Korean Patent Application No. 10-2019-0109843 filed on Sep. 5, 2019, the entire contents of which are incorporated herein by reference.

TECHNICAL FIELD

The present invention relates to a polymer electrolyte membrane for fuel cells and a method for manufacturing the same. The polymer electrolyte membrane for fuel cells may have improved handling properties and mechanical strength by employing symmetric-type laminated composite films.

BACKGROUND

Recently, a polymer electrolyte membrane fuel cell (PEMFC) has been most commonly used as a fuel cell for vehicles. In order to produce high output performance of at least several tens of kW in various operating conditions of a vehicle, the polymer electrolyte membrane fuel cell must be stably operated in a wide current density range.

In order to satisfy a required output level of the fuel cell, the fuel cell has been used in the form of a stack in which unit cells are stacked to be assembled. For example, the unit cell is configured such that gas diffusion layers (GDLs) and gaskets are stacked at outer parts of a membrane-electrode assembly (MEA), at which a cathode and an anode are located, and bipolar plates (or separators) having flow fields to supply reaction gas (hydrogen used as fuel and oxygen or air used as an oxidizer) and to pass cooling water are provided outside the GDLs. Hundreds of these unit cells can be stacked, and then, end plates to support the unit cells are coupled to the outermost unit cells.

Electrochemical reaction to produce electricity of the fuel cell occurs in the MEA including a perfluorinated sulfonic acid (PFSA) ionomer-based membrane and electrodes, i.e., the anode and the cathode. In the electrochemical reaction in the fuel cell, as expressed in the following reaction equation 1, once hydrogen supplied to an oxidation electrode, i.e., the anode, of the fuel cell is separated into protons and electrons by hydrogen oxidation reaction (HOR), the protons are moved to a reduction electrode, i.e., the cathode, through the membrane, and the electrons are moved to the cathode, through an external circuit. The protons and electrons react with oxygen gas supplied from the outside in the cathode by oxygen reduction reaction (ORR), and produce electricity and heat and simultaneously produce water as a by-product, as expressed in the following reaction equation 2.

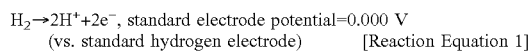

$H_2 \rightarrow 2H^+ + 2e^-$, standard electrode potential=0.000 V (vs. standard hydrogen electrode)  [Reaction Equation 1]

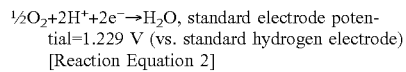

$\frac{1}{2}O_2 + 2H^+ + 2e^- \rightarrow H_2O$, standard electrode potential=1.229 V (vs. standard hydrogen electrode)  [Reaction Equation 2]

Since the fuel cell is usually operated at a high temperature of 60° C. or higher and dehydration is repeated due to heat generation caused by electrochemical reaction, repetitive dry-wet cycling occurs in the MEA. Wrinkled deformation may occur due to repetitive shrinkage and swelling of the electrolyte membrane under the repetitive dry-wet cycling condition, and thus, in order to maintain durability of the MEA of the fuel cell, robustness of the electrolyte membrane is very important.

In the related art, technology in which mechanical strength of an electrolyte membrane is improved by manufacturing a reinforced membrane by impregnating a porous reinforcement film with an ionomer dispersion has been reported.

Further, hydrogen supplied to the anode and oxygen supplied to the cathode must be separated by the polymer electrolyte membrane, but crossover, in which these gases are moved to the counterpart electrodes through the electrolyte membrane, occurs. That is, $H_2$ crossover, in which hydrogen supplied to the anode crosses over to the cathode, or $O_2$ crossover, in which oxygen supplied to the cathode crosses over to the anode, may occur. When this crossover occurs, ionomer degradation within the electrolyte membrane and the electrodes is accelerated or corrosion of a carbon substrate within the cathode is accelerated, thereby greatly lowering durability of the fuel cell.

Further, utilization efficiency of hydrogen used as the fuel is reduced or there is a danger of explosion or ignition due to hydrogen included in exhaust gas when crossover of an excessive amount of gas occurs, and thus, technology which suppresses crossover is positively necessary.

SUMMARY

In preferred aspects, provided is an electrolyte membrane which has improved mechanical strength.

In one preferred aspect, provided is an electrolyte membrane which has excellent handling properties.

In one preferred aspect, provided is an electrolyte membrane which suppresses gas crossover.

In one aspect, provided is a method for manufacturing a polymer electrolyte membrane for fuel cells. The method may include coating a pair of support films with an ionomer dispersion, impregnating a pair of porous reinforcement films with the ionomer dispersion by stacking each of the porous reinforcement films on each of the support films coated with the ionomer dispersion, manufacturing a pair of composite films by drying the pair of the porous reinforcement films impregnated with the ionomer dispersion, and thermally bonding the pair of the composite films. The pair of the thermally bonded composite films may have a symmetrical structure based on a bonding surface therebetween.

The term "ionomer" as used herein refers to a polymeric material or resin that includes ionized groups attached (e.g. covalently bonded) to the backbone of the polymer as pendant groups. Preferably, such ionized groups may be functionalized to have ionic characteristics, e.g., cationic or anionic. The ionomer may suitably include one or more polymers selected from the group consisting of a fluoro-based polymer, a perfluorosulfone-based polymer, a benzimidazole-based polymer, a polyimide-based polymer, a polyetherimide-based polymer, a polyphenylene sulfide-based polymer, a polysulfone-based polymer, a polyethersulfone-based polymer, a polyetherketone-based polymer, a polyether-etherketone-based polymer, a polyphenylquinoxaline-based polymer and a polystyrene-based polymer.

The "porous film" as used herein refers to a porous material formed in a film (e.g. thin film) that includes plurality of shapes of pores (e.g., circular, or non-circular), holes, cavity (e.g., microcavity), labyrinth, channel or the like, whether formed uniformly or without regularity. Exemplary porous substrate may include pores (e.g., closed or open pores) within a predetermined size within a range from sub-micrometer to micrometer size, which is measured by maximum diameter of the pores.

The ionomer dispersion may suitably include a perfluorinated sulfonic acid (PFSA)-based ionomer or a hydrocarbon-based ionomer.

A coating thickness of the ionomer dispersion may be about 20 to 500 μm.

The porous reinforcement films may include one or more selected from the group consisting of polytetrafluoroethylene, polyethylene terephthalate, polybenzoxazole, polyethylene, polypropylene, and polyimide.

Each of the porous reinforcement films may have porosity of about 50 to 95% and a thickness of about 1 to 20 μm.

The drying the pair of the porous reinforcement films may be performed at a temperature of about 40 to 100° C.

The thermally bonding the pair of the composite films may be performed at a temperature of about 100 to 200° C.

The thermally bonding the pair of the composite films may be performed such that the each of the porous reinforcement films stacked on the each of the composite films may be bonded to each other so as to be opposite each other.

The method may further include applying an adhesive to one surface of the pair of the composite films, after the manufacturing the pair of the composite films.

The method may further include, before the thermally bonding the pair of the composite films, applying a metal catalyst-mixed solution to one surface of one of the pair of the composite films to be thermally bonded.

The metal catalyst-mixed solution may include a metal catalyst, an ionomer and a solvent.

The metal catalyst may include one or more selected from the group consisting of platinum nanoparticles, and platinum nanoparticles supported on carbon.

A coating thickness of the metal catalyst-mixed solution may be about 2 to 200 μm.

The method may further include, before the thermally bonding the pair of the composite films, drying the composite film provided with one surface to which the metal catalyst-mixed solution is applied.

In another aspect, provided is a polymer electrolyte membrane for fuel cells. The polymer electrolyte membrane may include a pair of composite films and each of the composite film may include a porous reinforcement film and an ionomer provided to a surface and pores of the porous reinforcement film. The pair of the composite films may be thermally bonded, and may have a symmetrical structure based on a bonding surface therebetween.

An adhesive layer may be interposed between the pair of the thermally bonded composite films.

A gas barrier layer may be interposed between the pair of the thermally bonded composite films.

The gas barrier layer may include a metal catalyst and an ionomer.

The pair of the composite films may be thermally bonded such that each of the porous reinforcement films each of the respective composite films may be bonded to each other so as to be opposite each other.

Other aspects of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
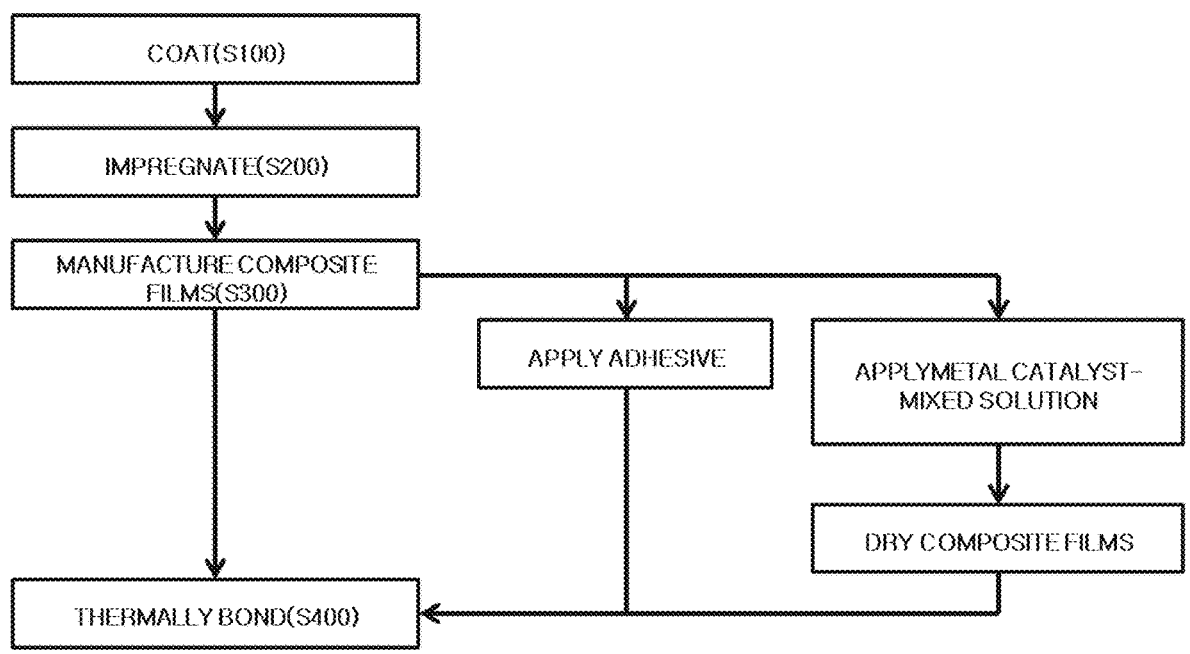
FIG. 1 shows an exemplary process for manufacturing an exemplary electrolyte membrane according to an exemplary embodiment of the present invention.

It should be understood that the appended drawings are not necessarily to scale, presenting a somewhat simplified representation of various preferred embodiments illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawings.

DETAILED DESCRIPTION

Hereinafter reference will be made in detail to various exemplary embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments within the spirit and scope of the invention as defined by the appended claims.

In the following description of the embodiments, the same elements are denoted by the same reference numerals even though they are depicted in different drawings. In the drawings, dimensions of structures are exaggerated as compared to actual dimensions thereof, for clarity of description. In the following description of the embodiments, terms, such as "first", "second", etc., may be used to describe various elements but do not limit the elements. These terms are used only to distinguish one element from other elements. For example, a first element may be named a second element and similarly the second element may be named the first element, within the spirit and scope of the invention. Singular expressions may encompass plural expressions, unless they have clearly different contextual meanings.

In the following description of the embodiments, terms, such as "including", "having", etc., will be interpreted as indicating the presence of characteristics, numbers, steps, operations, elements or parts stated in the description or combinations thereof, and do not exclude the presence of one or more other characteristics, numbers, steps, operations, elements, parts or combinations thereof, or possibility of adding the same. In addition, it will be understood that, when a part, such as a layer, a film, a region or a plate, is said to be "on" another part, the part may be located "directly on" the other part or other parts may be interposed between both parts. In the same manner, it will be understood that, when a part, such as a layer, a film, a region or a plate, is said to be "under" another part, the part may be located "directly under" the other part or other parts may be interposed between both parts.

All numbers, values and/or expressions representing amounts of components, reaction conditions, polymer compositions and blends used in the description are approximations in which various uncertainties in measurement generated when these values are acquired from essentially different things are reflected and thus, it will be understood that they are modified by the term "about", unless stated otherwise.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, it will be understood that, if a numerical range is disclosed in the description, such a range includes all continuous values from a minimum value to a maximum value of the range, unless stated otherwise. Further, if such a range refers to integers, the range includes all integers from a minimum integer to a maximum integer, unless stated otherwise.

In the following description of the embodiments, it will be understood that, when the range of a variable is stated, the variable includes all values within the stated range including stated end points of the range. For example, it will be understood that a range of "5 to 10" includes not only values of 5, 6, 7, 8, 9 and 10 but also arbitrary subranges, such as a subrange of 6 to 10, a subrange of 7 to 10, a subrange of 6 to 9, a subrange of 7 to 9, etc. and arbitrary values between integers which are valid within the scope of the stated range, such as 5.5, 6.5, 7.5, 5.5 to 8.5, 6.5 to 9, etc. Further, for example, it will be understood that a range of "10% to 30%" includes not only all integers including values of 10%, 11%, 12%, 13%, . . . 30% but also arbitrary subranges, such as a subrange of 10% to 15%, a subrange of 12% to 18%, a subrange of 20% to 30%, etc., and arbitrary values between integers which are valid within the scope of the stated range, such as 10.5%, 15.5%, 25.5%, etc.

Provided herein are a polymer electrolyte membrane for fuel cells and a method for manufacturing the same. The method for manufacturing the polymer electrolyte membrane for fuel cells corresponding to a method invention and the polymer electrolyte membrane for fuel cells corresponding to a product invention will be separately described.

Method for Manufacturing Polymer Electrolyte Membrane for Fuel Cells

The method for manufacturing the polymer electrolyte membrane for fuel cells includes coating a pair of support films with an ionomer dispersion, impregnating porous reinforcement films (e.g., a pair of porous reinforcement films) with the ionomer dispersion by stacking each of the porous reinforcement films on each of the support films coated with the ionomer dispersion, manufacturing a pair of composite films by drying the pair of the porous reinforcement films impregnated with the ionomer dispersion, and thermally bonding the pair of the composite films.

Figure 2:
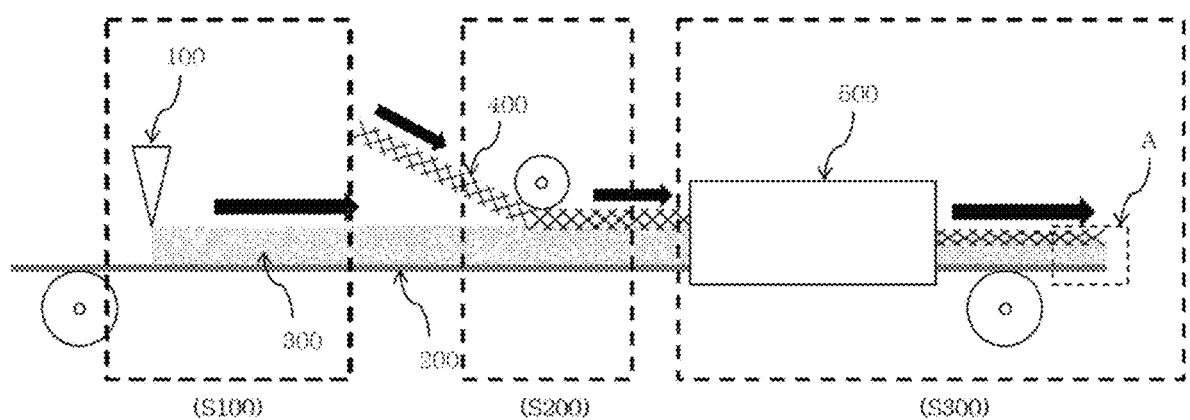
FIG. 2 shows an exemplary process for manufacturing an exemplary composite film according to an exemplary embodiment of the present invention.

FIG. 1 briefly shows an exemplary process for manufacturing an exemplary electrolyte membrane according to an exemplary embodiment of the present invention, and FIG. 2 briefly shows an exemplary manufacturing process. Referring to these figures, the respective operations will be described in detail. Although FIG. 2 illustrates a process for manufacturing a composite film for the sake of convenience in description, a pair of composite films will be referenced the following description. There must be no confusion therebetween.

Coating (Operation S100)

Support films 200 prepared in a pair may be coated with an ionomer dispersion 300. The ionomer dispersion 300 may be applied to the support films 200, and the support films 200 must have chemical stability sufficient not to be deformed by a solvent included in the ionomer dispersion 300, and mechanical stability sufficient to entirely support the ionomer dispersion 300 and porous reinforcement films 400.

The support films 200 may include one or more selected from the group consisting of polytetrafluoroethylene (PTFE), polyethylene terephthalate (PET), polybutylene terephthalate (PBT), polytrimethylene terephthalate (PTT), polyethylene naphthalate (PEN), polymethylpentene (PMP), polypropylene (PP), and polyimide (PI).

The ionomer dispersion 300 may be applied through an ionomer dispersion application apparatus 100, and the ionomer dispersion application apparatus 100 may be a bar coating apparatus, a comma coating apparatus, a gravure coating apparatus, a slot die coating apparatus, a screen printing apparatus or a spray coating apparatus. Particularly, the slot die coating apparatus may be used.

The ionomer dispersion 300 may include an ionomer 20 and the solvent. The ionomer dispersion 300 may have a structure in which the ionomer 20 in powder form is dispersed in the solvent, and the solvent may include one or more selected from the group consisting of isopropyl alcohol (IPA), n-propyl alcohol (nPA), ethyl alcohol, and deionized water.

The ionomer 20 may serve as passages through which protons may move in an electrolyte membrane, and include a perfluorinated sulfonic acid (PFSA)-based ionomer or a hydrocarbon-based ionomer.

The coating thickness of a coating layer formed by coating the support film 200 with the ionomer dispersion 300 may be about 20 μm to 500 μm. When the coating thickness of the ionomer dispersion 300 is less than about 20 μm, it may be difficult to sufficiently impregnate the porous reinforcement films 400 with the ionomer dispersion 300 at the time of impregnation which will be described below, and when the thickness of the ionomer dispersion 300 is greater than about 500 μm, the coated ionomer dispersion 300 may not maintain the shape thereof and may flow on the support film 200. Furthermore, the thickness of the electrolyte membrane may be increased and thus performance of the fuel cell may be decreased due to increase in the ionic resistance of the electrolyte membrane. Particularly, the coating thickness of the ionomer dispersion 300 may be 50 μm to 200 μm.

Impregnating (Operation S200)

The porous reinforcement films 400 may be impregnated with the ionomer dispersion 300 by stacking each of the porous reinforcement films 400 on each of the support films 200 coated with the ionomer dispersion 300. When the porous reinforcement films 400 are stacked on the support films 200, the porous reinforcement films 400 may be impregnated with the ionomer dispersion 300 dispersed on the support films 200 through pores formed in the porous reinforcement films 400.

The stacking method is not limited to a specific method, and in the present invention, a roll lamination method is employed.

The porous reinforcement films 400 may include one or more selected from the group consisting of polytetrafluoroethylene, polyethylene terephthalate, polybenzoxazole, polyethylene, polypropylene, and polyimide.

The porosity of the porous reinforcement films 400 may be about 50 to 95%. When the porosity is less than about 50%, movement passages of protons may be reduced, and thereby, ionic resistance of the electrolyte membrane may be increased and thus performance of the fuel cell may be lowered. On the other hand, when the porosity is greater than about 95%, improvement in the mechanical strength of the electrolyte membrane may be insignificant.

The thickness of the porous reinforcement films 400 may be about 1 μm to 20 μm. When the thickness deviates from this range, the mechanical strength of the porous reinforcement films 400 may be reduced, or the ionic resistance of protons may be increased.

Manufacturing Composite Films (Operation S300)

A pair of composite films A may be manufactured by drying a pair of the porous reinforcement films 400 impregnated with the ionomer dispersion 300.

When the porous reinforcement films 400 are sufficiently impregnated with the ionomer dispersion 300, the composite films A may be manufactured by drying the porous reinforcement films 400 impregnated with the ionomer dispersion 300 using a dying apparatus 500. The drying temperature may be about 40 to 100° C. When the drying temperature is less than about 40° C., a drying time may be excessively prolonged, and thus, a process cycle time may be increased. On the other hand, when the drying temperature is greater than about 100° C., a degree of crystallinity of the ionomer 20 may be increased, and thereby interfacial adhesion in thermal bonding, which will be described below, may be lowered and thus cause cell failure, in which the electrolyte membrane is damaged and unit cells of the fuel cell are not normally operated any more during the long-term operation of the fuel cell. Further, when the drying temperature is excessively raised, thermal degradation of the ionomer 20 may occur. More particularly, the drying temperature may be about 60 to 85° C.

The coating thickness of the ionomer dispersion 300 may be reduced due to removal of the solvent from the ionomer dispersion 300 applied to the support films 200 through the drying, and in this case, the coating thickness of the ionomer dispersion 300 may be reduced to about 3 to 50% through the drying. The reduction rate of the coating thickness may be varied according to the content of the ionomer 20 in the ionomer dispersion 300 and the kind of the solvent.

The method for manufacturing the polymer electrolyte membrane for fuel cells may further include applying an adhesive to one surface of the composite films A after manufacturing the composite films A. When the adhesive is applied, the adhesive may be applied to at least one of the composite films A prepared in a pair, so as to increase adhesive force when the composite films A are thermally bonded thereafter.

The adhesive may be different from or the same as the ionomer dispersion 300 of the present invention, and particularly, may be the same as the ionomer dispersion 300. That is, the adhesive essentially includes the ionomer 20 so as to prevent reducing conductivity of protons at the interface between the respective composite films A when the composite films A are thermally bonded.

The application of the adhesive may be performed by a bar coating method, a comma coating method, a gravure coating method, a slot die coating method, a screen printing method, a spray coating method or combinations thereof, and particularly, may be performed using the spray coating method.

The method for manufacturing the polymer electrolyte membrane for fuel cells may further include drying the adhesive, after applying the adhesive. For example, the drying temperature of the adhesive may be about 25 to 100° C. When the drying temperature of the adhesive is less than about 25° C., drying effects may not be sufficient, and when the drying temperature of the adhesive is greater than about 100° C., the degree of crystallinity of the ionomer 20 may be increased, and thus, adhesive force at the thermal bonding interface may be reduced.

Thermal Bonding (Operation S400)

The composite films A prepared in a pair may be thermally bonded. The porous reinforcement films 400 included in the respective dried composite films A may be located so as to be opposite each other, and may be then thermally bonded. The pair of the thermally bonded composite films A may have a symmetrical structure based on a bonding surface therebetween.

Figure 3:
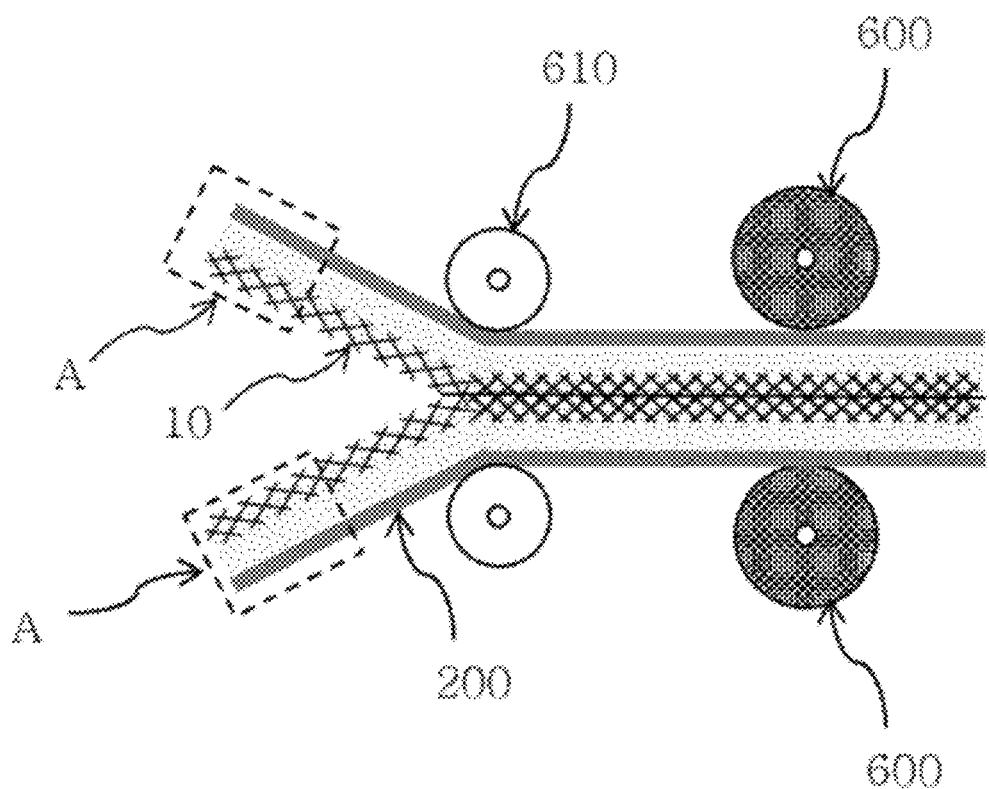
FIG. 3 shows an exemplary process for manufacturing an exemplary electrolyte membrane by thermally bonding a pair of composite films.

FIG. 3 is a view briefly illustrating a process for thermally bonding the composite films A according to an exemplary embodiment of the present invention. As shown in FIG. 3, the thermal bonding between the composite films A may be performed by a thermal bonding apparatus 600. The respectively manufactured composite films A may be provided so as to be symmetrical with each other, and the porous reinforcement films 10 of the composite films A may be bonded to each other by bonding rollers 610, thus forming a bonding surface.

Thereafter, the composite films A bonded to each other may be thermally bonded at designated temperature and pressure by the thermal bonding apparatus 600.

The thermal bonding apparatus 600 may include a plate-type press or a roll press, and particularly, thermally bonds the composite films A through the roll press, which may be used to continuously manufacture an electrolyte membrane through a continuous process. In this case, a process cycle time may be shortened.

The thermal bonding temperature may be about 100 to 200° C. When the thermal bonding temperature is less than about 100° C., binding force between the composite films A may not be sufficient and thus the composite films A may be separated from each other, thereby entailing the risk of accelerating damage to the electrolyte membrane during operation of the fuel cell. On the other hand, when the thermal bonding temperature is greater than about 200° C., thermal degradation of the ionomer 20 and deformation of the support films 200 may be excessively increased and thus the quality of the electrolyte membrane may be seriously reduced. Particularly, the thermal bonding temperature may be about 140 to 180° C.

The thermal bonding pressure is not limited to a specific pressure, and may be freely varied according to purpose.

The method for manufacturing the polymer electrolyte membrane for fuel cells may further include applying a metal catalyst-mixed solution 800 to one surface of one of the bonded composite films A, before thermally bonding the composite films A.

Figure 4:
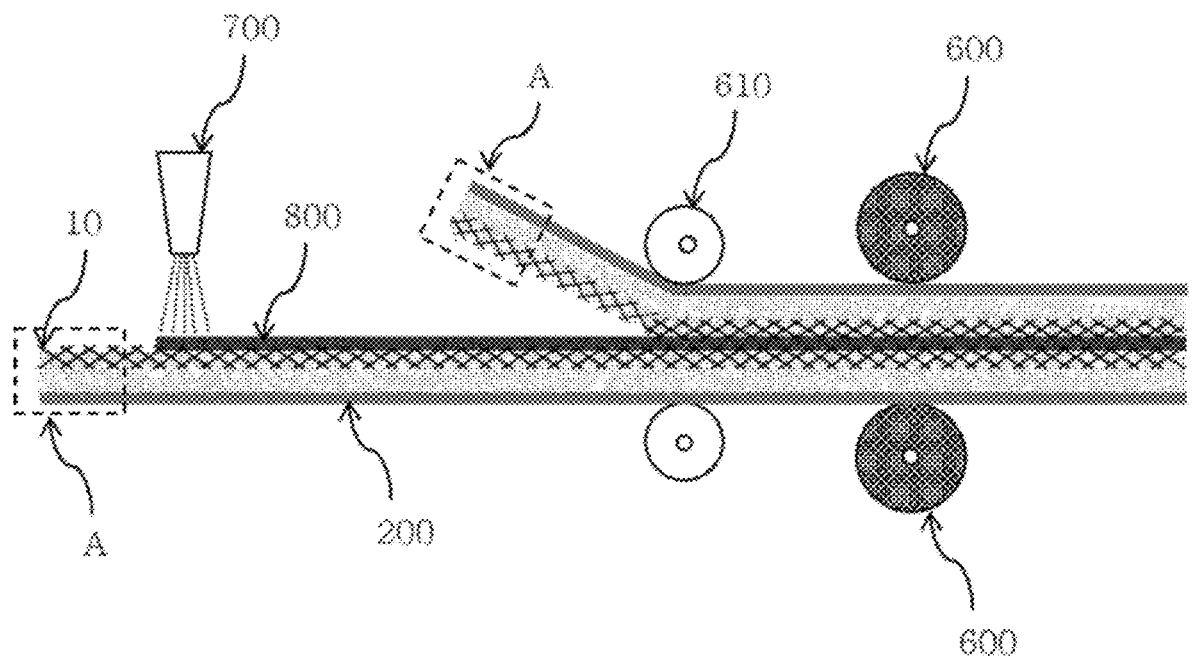
FIG. 4 shows an exemplary process for manufacturing an exemplary electrolyte membrane according to an exemplary embodiment of the present invention to which an exemplary metal catalyst-mixed solution is applied.

FIG. 4 shows the process for manufacturing the electrolyte membrane according to an exemplary embodiment of the present invention to which the metal catalyst-mixed solution 800 is applied. As shown in FIG. 4, the metal catalyst-mixed solution 800 may be applied to one of the composite films A through a metal-catalyst mixed solution application apparatus 700. The metal catalyst-mixed solution 800 may be applied to one surface of the composite film A provided with the porous reinforcement film 10, among both surfaces of the composite film A.

The metal catalyst-mixed solution 800 may be applied to one surface of one of the pair of the composite films A, which are thermally bonded, and may be dried to form a gas barrier layer 30. For example, the gas barrier layer 30 may be interposed between the bonded composite films A. That is, the gas barrier layer 30 may be formed on one of the thermally bonded composite films A, and the other of the composite films A may be thermally bonded to the gas barrier layer 30.

The metal-catalyst mixed solution application apparatus 700 may be a bar coating apparatus, a comma coating apparatus, a gravure coating apparatus, a slot die coating apparatus, a screen printing apparatus, a spray coating apparatus, or combinations thereof. Particularly, the slot die coating apparatus may be used.

The method for manufacturing the polymer electrolyte membrane for fuel cells may further include drying the composite film A provided with one surface, to which the metal catalyst-mixed solution 800 is applied, after applying the metal catalyst-mixed solution 800. Although a drying apparatus which performs drying of the composite film A is omitted in FIG. 4, the drying apparatus may be located between the metal catalyst-mixed solution application apparatus 700 and the bonding rollers 610, and thus dries the metal catalyst-mixed solution 800. For example, the coating thickness of the metal catalyst-mixed solution 800 may be reduced to about 3 to 50% due to drying. The drying of the metal catalyst-mixed solution 800 may be performed in a temperature range of about 25 to 100° C. When the drying temperature of the metal catalyst-mixed solution 800 is less than about 25° C., drying effects may not be sufficient, and when the drying temperature of the metal catalyst-mixed solution 800 is greater than about 100° C., the degree of crystallinity of an ionomer may be increased, and thus, adhesive force at the thermal bonding interface may be reduced.

The metal catalyst-mixed solution 800 may include a metal catalyst, the ionomer and the solvent.

The metal catalyst may include one or more selected from the group consisting of platinum nanoparticles, and platinum nanoparticles supported on carbon.

The ionomer may be the same as the ionomer 20 included in the composite films A in accordance with the present invention, and the solvent may include one or more selected from the group consisting of isopropyl alcohol (IPA), n-propyl alcohol (nPA), ethyl alcohol, and deionized water, without being limited thereto.

The metal catalyst-mixed solution 800 may be manufactured by mixing the metal catalyst and the ionomer with the solvent, sufficiently agitating an acquired mixture using an agitator and then performing ultrasonication.

The application of the metal catalyst-mixed solution 800 may be performed so that the gas barrier layer 30 formed by applying the metal catalyst-mixed solution 800 may be located between a pair of the thermally bonded composite films A and thus the metal catalyst included in the metal catalyst-mixed solution 800 reacts with gas passing through the electrolyte membrane during operation of the fuel cell so as to suppress gas crossover.

The coating thickness of the metal catalyst-mixed solution 800 may be about 2 to 200 μm. When the coating thickness of the metal catalyst-mixed solution 800 is less than about 2 μm, gas crossover suppressing effects may not be sufficient and thus it is difficult to improve durability of the electrolyte membrane. On the other hand, when the coating thickness of the metal catalyst-mixed solution 800 is greater than about 200 μm, the amount of the high-priced metal catalyst which is used is increased and thus material costs may be increased, and the thickness of the gas barrier layer 30 may be increased and thus conductivity of protons in the electrolyte membrane may be reduced. Moreover, an excessively large amount of the solvent included in the metal catalyst-mixed solution 800 may be absorbed into the composite films A, and thus, the shape of the composite films A may be deformed and thereby quality of the electrolyte membrane may be degraded. Particularly, the coating thickness may be about 20 to 120 μm.

Since all processes, such as supply of the support films 200, application of the ionomer dispersion 300 to the support films 200, supply of the porous reinforcement films 400, stacking of the porous reinforcement films 400 on the support films 200 to which the ionomer dispersion 300 is applied, manufacture of the electrolyte membrane by thermally bonding the composite films A manufactured in a pair, and the like may be performed in a roll-to-roll manner, and operations, such as stacking, thermal bonding, and the like may be performed based on rotational motion of rolls, these processes may be continuously performed, and thus, the efficiency and economy of processing may be increased.

Polymer Electrolyte Membrane for Fuel Cells

A polymer electrolyte membrane for fuel cells may include a pair of composite films A, and each of the composite films A may include a porous reinforcement film 10 and an ionomer 20 provided to the surface and pores of the porous reinforcement film 10. The pair of the composite films A may be thermally bonded, and may have a symmetrical structure based on the bonding surface therebetween.

Figure 5:
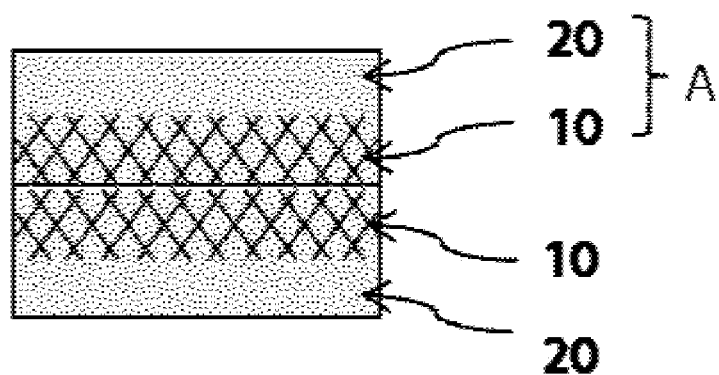
FIG. 5 shows an exemplary electrolyte membrane according to an exemplary embodiment of the present invention.
Figure 6:
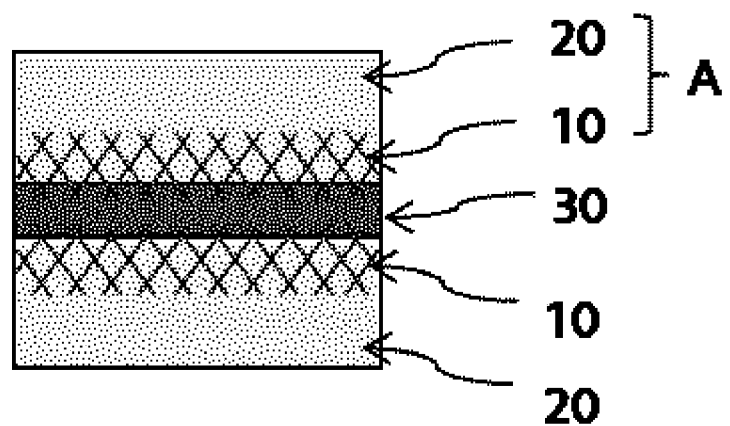
FIG. 6 is a view briefly illustrating the electrolyte membrane in accordance with the present invention to which a gas barrier layer is applied.

FIGS. 5 and 6 show the polymer electrolyte membrane for fuel cells according to exemplary embodiments of the present invention, and the polymer electrolyte membrane for fuel cells corresponding to a product invention will be described with reference to FIGS. 5 and 6. However, a description of the configuration and operation of the polymer electrolyte membrane for fuel cells, which are substantially the same as those of the above-described method for manufacturing the polymer electrolyte membrane for fuel cells, will be omitted.

As shown in FIG. 5, the polymer electrolyte membrane for fuel cells is configured such that a pair of composite films A is bonded. Each of the composite films A may include the porous reinforcement film 10, and the composite films A may be bonded such that the porous reinforcement films 10 thereof contact each other. Further, it may be understood that the ionomer 20 which does not impregnate the porous reinforcement films 10 of the composite films A forms the outer surface of the electrolyte membrane. For example, a pair of composite films A may have a symmetrical structure based on the bonding surface therebetween.

An adhesive layer may be interposed between the pair of composite films A, and the adhesive layer may be a dried form of the adhesive noted in the above-described method for manufacturing the polymer electrolyte membrane for fuel cells.

Further, the gas barrier layer 30 may be interposed between the pair of composite films A. FIG. 6 illustrates the polymer electrolyte membrane for fuel cells to which the gas barrier layer 30 is applied. As shown in FIG. 6, the gas barrier layer 30 may be located between the composite films A and the respective composite films A are symmetrical with each other about the gas barrier layer 30. The gas barrier layer 30 may be a dried form of the metal catalyst-mixed solution 800 noted in the above-described method for may be the polymer electrolyte membrane for fuel cells. The gas barrier layer 30 may be acquired by removing the solvent from the metal catalyst-mixed solution 800, and may include the metal catalyst and the ionomer.

When a fuel cell is operated, rolling of the fuel cell occurs due to a difference in degrees of shrinkage and swelling between both surfaces of an electrolyte membrane caused by repetitive dry-wet cycling. However, in the electrolyte membrane in which composite films prepared in a pair are thermally bonded to each other so as to form a symmetrical structure, the porous reinforcement films having high mechanical strength may be provided so as to be symmetrical with each other around the bonding surface therebetween, and thus the above problem is not caused.

Example

Hereinafter, the present invention will be described in more detail with reference to the following examples. The following examples serve merely to exemplarily describe the present invention and are not intended to limit the scope of the invention.

Example 1

A dispersion 300 including a perfluorinated sulfonic acid (PFSA)-based ionomer was applied to about 150 μm to a PET support film 200 using a bar coating apparatus, a PTFE reinforcement film 10 having an average thickness of about 5 μm and average porosity of 60% was stacked on the ionomer dispersion 300 so as to be impregnated with the ionomer dispersion 300, and then drying was performed at a temperature of about 80° C., thereby manufacturing a composite film A.

Figure 7:
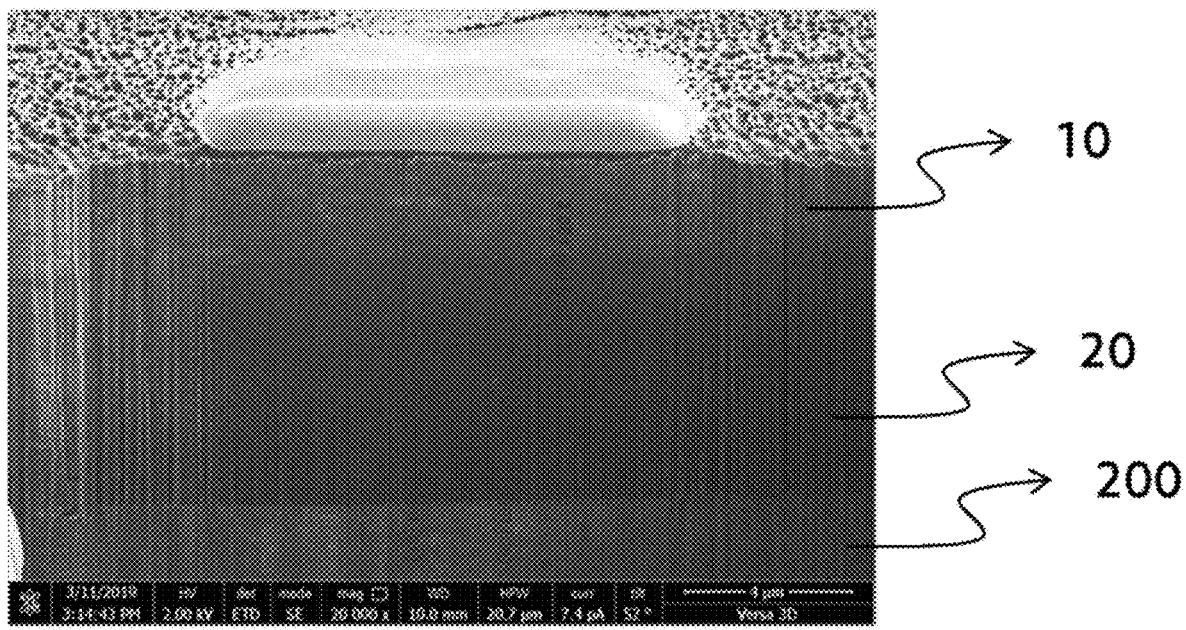
FIG. 7 shows the cross-sectional image of an exemplary composite film according to an exemplary embodiment of the present invention.

FIG. 7 is a photograph representing the cross-section of the composite film A in accordance with example 1, and it may be confirmed from FIG. 7 that the composite film A having a thickness of about 10 μm was manufactured.

Example 2

Two composite films A were manufactured through the same method as in example 1, a metal catalyst-mixed solution 800 including platinum nanoparticles supported on carbon and a perfluorinated sulfonic acid (PFSA)-based ionomer was applied to one surface of one of the two composite films A using a bar coating apparatus, and then drying is performed at a temperature of about 80° C., thereby manufacturing a gas barrier layer 30 having a thickness of about 5 μm.

The two composite films A were stacked such that the gas barrier layer 30 was interposed therebetween by locating the remaining composite film A on the composite film A provided with the gas barrier layer 30 formed thereon so that the respective composite films A were symmetrical with each other around the gas barrier layer 30, and were then thermally bonded to each other at a temperature of 140° C. using a thermal bonding apparatus using a plate-type press, thereby manufacturing an electrolyte membrane.

Figure 8:
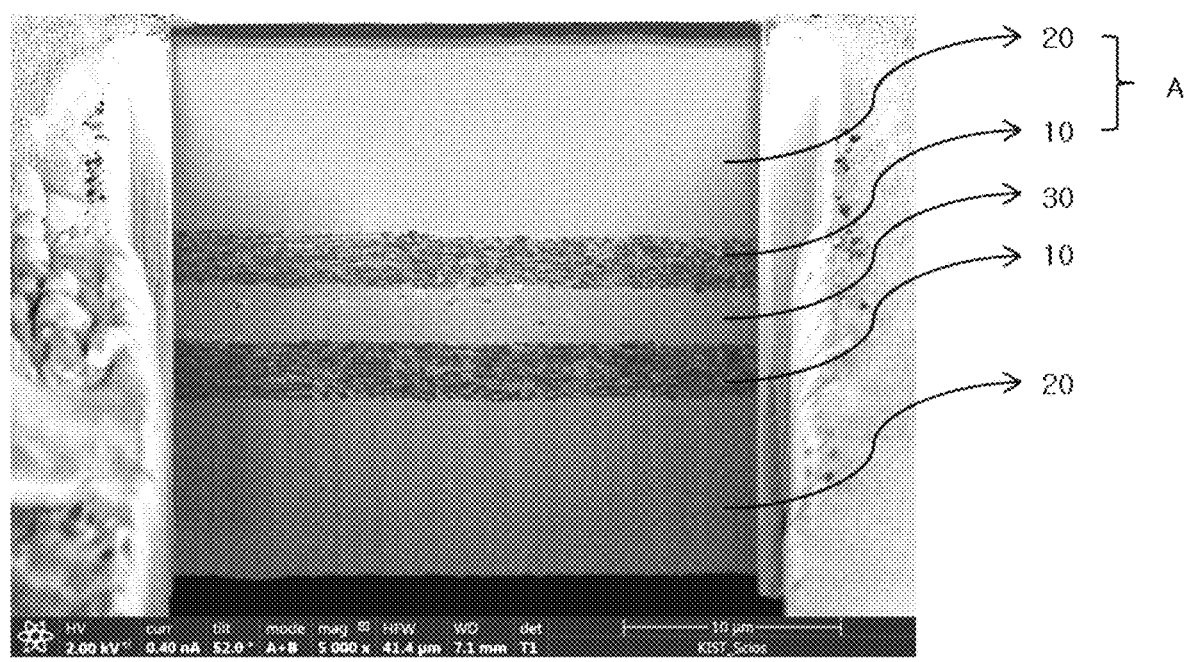
FIG. 8 shows a photograph representing the cross-sectional image of an exemplary electrolyte membrane according to an exemplary embodiment of the present invention.

FIG. 8 is a photograph representing the cross-section of the electrolyte membrane manufactured in accordance with example 2, and it may be confirmed from FIG. 8 that the composite films A having a thickness of about 10 μm were bonded to each other with the gas barrier layer 30 interposed therebetween so as to be symmetrical with each other.

As is apparent from the above description, wrinkled deformation of a fuel cell may be suppressed during long-term operation of the fuel cell.

According to various exemplary embodiments of the present invention, rolling of the fuel cell occurring due to a difference in degrees of shrinkage and swelling between both surfaces of an electrolyte membrane may be reduced, and thus, handling properties of the electrolyte membrane may be improved.

According to various exemplary embodiments of the present invention, durability of the electrolyte membrane may be improved through a comparatively simple and inexpensive method, and thus, cost reduction and marketability of the electrolyte membrane may be enhanced.

Moreover, according to various exemplary embodiments of the present invention, the electrolyte membrane in which gas crossover is suppressed may be provided.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a polymer electrolyte membrane, comprising:
    coating a pair of support films with an ionomer dispersion;
    impregnating a pair of porous reinforcement films with the ionomer dispersion by stacking each of the porous reinforcement films on each of the support films coated with the ionomer dispersion;
    manufacturing a pair of composite films by drying the pair of the porous reinforcement films impregnated with the ionomer dispersion; and
    thermally bonding the pair of the composite films,
    wherein the pair of the thermally bonded composite films has a symmetrical structure based on a bonding surface therebetween.

2. The method of claim 1, wherein the ionomer dispersion comprises a perfluorinated sulfonic acid (PFSA)-based ionomer or a hydrocarbon-based ionomer.

3. The method of claim 1, wherein a coating thickness of the ionomer dispersion is about 20 to 500 μm.

4. The method of claim 1, wherein the each of the porous reinforcement films comprises one or more selected from the group consisting of polytetrafluoroethylene, polyethylene terephthalate, polybenzoxazole, polyethylene, polypropylene, and polyimide.

5. The method of claim 1, wherein the each of the porous reinforcement films has porosity of about 50 to 95% and a thickness of about 1 to 20 μm.

6. The method of claim 1, wherein the drying the pair of the porous reinforcement films is performed at a temperature of about 40 to 100° C.

7. The method of claim 1, wherein the thermally bonding the pair of the composite films is performed at a temperature of about 100 to 200° C.

8. The method of claim 1, wherein the thermally bonding the pair of the composite films is performed such that each of the porous reinforcement films stacked on the each of the composite films are bonded to each other so as to be opposite each other.

9. The method of claim 1, further comprising, after the manufacturing the pair of the composite films, applying an adhesive to one surface of the pair of the composite films, wherein the adhesive is the same as the ionomer dispersion.

10. The method of claim 1, further comprising, before the thermally bonding the pair of the composite films, applying a metal catalyst-mixed solution to one surface of each of the pair of the composite films to be thermally bonded.

11. The method of claim 10, wherein the metal catalyst-mixed solution comprises a metal catalyst, an ionomer and a solvent.

12. The method of claim 11, wherein the metal catalyst comprises one or more selected from the group consisting of platinum nanoparticles, and platinum nanoparticles supported on carbon.

13. The method of claim 10, wherein a coating thickness of the metal catalyst-mixed solution is about 2 to 200 μm.

14. The method of claim 10, further comprising, before thermally bonding the pair of the composite films, drying the composite film provided with one surface to which the metal catalyst-mixed solution is applied.

* * * * *